(12) United States Patent
Kubota et al.

(10) Patent No.: US 11,008,016 B2
(45) Date of Patent: May 18, 2021

(54) DISPLAY SYSTEM, DISPLAY METHOD, AND STORAGE MEDIUM

(71) Applicant: HONDA MOTOR CO., LTD., Tokyo (JP)

(72) Inventors: Fue Kubota, Wako (JP); Mineyuki Yoshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 181 days.

(21) Appl. No.: 16/296,335

(22) Filed: Mar. 8, 2019

(65) Prior Publication Data

US 2019/0283770 A1 Sep. 19, 2019

(30) Foreign Application Priority Data

Mar. 15, 2018 (JP) .............................. JP2018-047971

(51) Int. Cl.
| | |
|---|---|
| *B60W 50/08* | (2020.01) |
| *B60K 35/00* | (2006.01) |
| *B60W 30/18* | (2012.01) |
| *B60W 10/04* | (2006.01) |
| *B62D 15/02* | (2006.01) |

(52) U.S. Cl.
CPC .......... *B60W 50/082* (2013.01); *B60K 35/00* (2013.01); *B60W 10/04* (2013.01); *B60W 30/18163* (2013.01); *B62D 15/0255* (2013.01); *B60K 2370/155* (2019.05); *B60K 2370/186* (2019.05)

(58) Field of Classification Search
CPC ............... B60W 50/082; B60W 50/14; B60W 2050/146; B60W 10/04; B60W 30/18163; B60K 2370/155; B60K 2370/175; B60K 2370/186; B60K 35/00; B62D 15/025; B62D 15/0255
USPC .......................................................... 701/41
See application file for complete search history.

(56) References Cited

U.S. PATENT DOCUMENTS

| | | | |
|---|---|---|---|
| 10,692,377 B1* | 6/2020 | Kentley-Klay | ...... G05D 1/0212 |
| 2017/0036673 A1* | 2/2017 | Lee | .......................... B60W 30/09 |
| 2017/0171375 A1* | 6/2017 | Kamata | ................ H04B 1/3822 |

(Continued)

FOREIGN PATENT DOCUMENTS

| | | | | |
|---|---|---|---|---|
| CN | 107776578 A | * | 3/2018 | ............. B60K 35/00 |
| FR | 3041778 A1 | * | 3/2017 | ........... G05D 1/0061 |

(Continued)

*Primary Examiner* — Atul Trivedi
(74) *Attorney, Agent, or Firm* — Amin, Turocy & Watson, LLP

(57) ABSTRACT

A display system includes a display configured to display an image, a driving controller configured to execute a first driving mode in which one or both of steering and acceleration/deceleration of a vehicle are controlled on the basis of a prescribed event accompanied by a change in behavior of the vehicle or a second driving mode in which a degree of reliance on an operation of an occupant of the vehicle is greater than that in the first driving mode, and a display controller configured to control the display, wherein the display controller causes the display to display an image indicating the occurrence of the prescribed event to be executed in the first driving mode at a timing before the behavior of the vehicle changes and display information for prompting the occupant to implement the change in the behavior executed by the driving controller.

8 Claims, 11 Drawing Sheets

(56) References Cited

U.S. PATENT DOCUMENTS

| | | | | |
|---|---|---|---|---|
| 2017/0225711 A1* | 8/2017 | DeCia | ................ | B60W 50/085 |
| 2017/0240185 A1* | 8/2017 | Li | ...................... | B60W 40/08 |
| 2017/0305418 A1* | 10/2017 | Bae | .................... | B60W 30/08 |
| 2017/0313311 A1* | 11/2017 | Niino | .................. | B60W 30/146 |
| 2017/0327110 A1* | 11/2017 | Inoue | ................. | B60W 30/095 |
| 2018/0037224 A1* | 2/2018 | Bogner | ............... | B60W 50/14 |
| 2018/0201134 A1* | 7/2018 | Choi | ..................... | G06T 17/05 |
| 2018/0201273 A1* | 7/2018 | Xiao | ................... | G05D 1/0246 |
| 2018/0286242 A1* | 10/2018 | Talamonti | ............. | B60W 30/14 |
| 2018/0345955 A1* | 12/2018 | Kim | ................... | B62D 15/028 |
| 2018/0345960 A1* | 12/2018 | Fujii | ................. | B62D 15/0255 |
| 2018/0370527 A1* | 12/2018 | Rachor | ................ | B60W 50/14 |
| 2019/0241198 A1* | 8/2019 | Mori | ................... | B60W 50/14 |
| 2020/0108869 A1* | 4/2020 | You | ........................ | H04W 4/46 |
| 2020/0202535 A1* | 6/2020 | Lee | .................... | B60W 40/105 |
| 2020/0231179 A1* | 7/2020 | Tian | ....................... | A61B 5/18 |
| 2020/0267351 A1* | 8/2020 | Lee | ........................ | H04N 5/247 |
| 2020/0307642 A1* | 10/2020 | Tsuji | ................ | B60W 60/0053 |
| 2020/0319644 A1* | 10/2020 | Li | ........................ | B60W 50/14 |
| 2020/0338983 A1* | 10/2020 | Alalao | .................. | B60K 35/00 |

FOREIGN PATENT DOCUMENTS

| | | | | |
|---|---|---|---|---|
| JP | 2016-199204 | 12/2016 | | |
| WO | WO-2017003013 A1 * | 1/2017 | .......... | G08G 1/0962 |
| WO | WO-2017003052 A1 * | 1/2017 | ............ | G08G 1/165 |
| WO | WO-2017026504 A1 * | 2/2017 | .......... | G05D 1/0061 |
| WO | WO-2017094783 A1 * | 6/2017 | ............. | G08G 1/16 |
| WO | WO-2017130482 A1 * | 8/2017 | .......... | G05D 1/0088 |
| WO | WO-2017169608 A1 * | 10/2017 | ............ | B60K 35/00 |
| WO | WO-2018012474 A1 * | 1/2018 | ............ | B60K 35/00 |

* cited by examiner

DISPLAY SYSTEM, DISPLAY METHOD, AND STORAGE MEDIUM

CROSS-REFERENCE TO RELATED APPLICATION

Priority is claimed on Japanese Patent Application No. 2018-047971, filed Mar. 15, 2018, the content of which is incorporated herein by reference.

BACKGROUND

Field of the Invention

The present invention relates to a display system, a display method, and a storage medium.

Description of Related Art

In recent years, research on automatically controlling a vehicle has been conducted. In relation thereto, technology for displaying a progress situation of a lane change in automated driving on a screen when traveling of a vehicle according to automated driving is controlled so that a lane change from a current traveling lane to an adjacent lane is made is known (for example, Japanese Unexamined Patent Application, First Publication No. 2016-199204).

SUMMARY

However, in the conventional technology, smooth switching of driving may not be able to be performed because it is not possible to transfer an event executed in automated driving to an occupant when automated driving cannot be continued due to a situation in the vicinity of a vehicle and switching to manual driving is performed.

The present invention has been made in consideration of such circumstances and an objective of the present invention is to provide a display system, a display method, and a storage medium capable of implementing smooth switching of driving.

A display system, a display method, and a storage medium according to the present invention adopt the following configurations.

(1): According to an aspect of the present invention, a display system is provided, including: a display configured to display an image; a driving controller configured to execute a first driving mode in which one or both of steering and acceleration/deceleration of a vehicle are controlled on the basis of a prescribed event accompanied by a change in behavior of the vehicle or a second driving mode in which a degree of reliance on an operation of an occupant of the vehicle is greater than that in the first driving mode; and a display controller configured to control the display, wherein the display controller causes the display to display an image indicating the occurrence of the prescribed event to be executed in the first driving mode at a timing before the behavior of the vehicle changes, and wherein, when the driving controller determines that switching from the first driving mode to the second driving mode is required before completion of the prescribed event, the display controller causes the display to display information for prompting the occupant to implement the change in the behavior executed by the driving controller in the second driving mode if the prescribed event is continued in the first driving mode.

(2): In the above-described aspect (1), the display system further includes an occupant situation acquirer configured to acquire a situation of the occupant, wherein, when the situation of the occupant acquired by the occupant situation acquirer is a situation in which it is possible to execute the second driving mode, the display controller causes the display to display information for prompting the occupant to execute the change in the behavior executed by the driving controller in the second driving mode if the event is continued in the first driving mode.

(3): In the above-described aspect (1) or (2), the display controller causes the display to display a reason that the switching to the second driving mode is required when it is determined that the switching from the first driving mode to the second driving mode is required before the completion of the prescribed event.

(4): In the above-described aspects (1) to (3), the event includes an event for changing a lane of the vehicle.

(5): In the above-described aspects (1) to (4), the information for prompting the occupant to implement the change in the behavior of the vehicle according to the event in the second driving mode includes a graphic form indicating a region corresponding to a recommended traveling lane of the vehicle set when the first driving mode is executed and a graphic form indicating a route change direction of the vehicle.

(6): In the above-described aspects (1) to (5), the display controller causes the display to display emphasized information obtained by emphasizing information for prompting the occupant to execute the change in the behavior of the vehicle according to the event in the second driving mode on the basis of a degree of urgency for executing the event.

(7): According to an aspect of the present invention, a display method is provided, including: displaying, by a display system, an image on a display; executing, by the display system, driving control including a first driving mode in which one or both of steering and acceleration/deceleration of a vehicle are controlled on the basis of a prescribed event accompanied by a change in behavior of the vehicle or a second driving mode in which a degree of reliance on an operation of an occupant of the vehicle is greater than that in the first driving mode; causing, by the display system, the display to display an image indicating the occurrence of the prescribed event to be executed in the first driving mode at a timing before the behavior of the vehicle changes; and causing, by the display system, the display to display information for prompting the occupant to implement the change in the behavior executed by the driving control in the second driving mode if the prescribed event is continued in the first driving mode when it is determined that switching from the first driving mode to the second driving mode is required before completion of the prescribed event.

(8): According to an aspect of the present invention, a storage medium is provided for causing a display system to: display an image on a display; execute driving control including a first driving mode in which one or both of steering and acceleration/deceleration of a vehicle are controlled on the basis of a prescribed event accompanied by a change in behavior of the vehicle or a second driving mode in which a degree of reliance on an operation of an occupant of the vehicle is greater than that in the first driving mode; cause the display to display an image indicating the occurrence of the prescribed event to be executed in the first driving mode at a timing before the behavior of the vehicle changes; and cause the display to display information for prompting the occupant to implement the change in the behavior executed by the driving control in the second driving mode if the prescribed event is continued in the first driving mode when it is determined that switching from the first driving mode to the second driving mode is required before completion of the prescribed event.

According to the aspects (1) to (8), it is possible to implement smooth switching of driving.

DESCRIPTION OF EMBODIMENTS

Embodiments of a display system, a display method, and a storage medium of the present invention will be described below with reference to the drawings. In the embodiment, a case in which a vehicle performs automated driving (autonomous driving) or the display system causes a result of recognizing the vicinity of the vehicle to be displayed is shown as an example. The automated driving indicates a process in which the vehicle is driven by controlling one or both of steering and acceleration/deceleration of the vehicle and is a type of driving support. Hereinafter, in the driving support, a mode in which one or both of the steering and the acceleration/deceleration of the vehicle are controlled on the basis of a prescribed event accompanied by a change in behavior of the vehicle is referred to as a first driving mode and a mode in which a degree of reliance on an operation of an occupant of the vehicle is higher than that in the first driving mode is referred to as a second driving mode.

Combination patterns of the first driving mode and the second driving mode include a first pattern in which the first driving mode is a mode in which the vehicle is driven by controlling the steering and acceleration/deceleration of the vehicle independently of the occupant's operation and the second driving mode is a mode in which so-called manual driving is performed, a second pattern in which the first driving mode is a mode in which the vehicle is driven by controlling at least one of the steering and acceleration/deceleration of the vehicle and the second driving mode is a mode in which the vehicle is driven while driving support such as lane-keeping control or vehicular gap keeping control is used, a third pattern in which the first driving mode is a mode in which the vehicle is driven by controlling the steering and acceleration/deceleration of the vehicle without depending on the occupant's operation and the second driving mode is a mode in which the vehicle is driven by controlling the steering and acceleration/deceleration of the vehicle without depending on the occupant's operation, but an attention/monitoring obligation imposed on the occupant is heavy (for example, there are obligations to grip a steering wheel and to monitor a view in front), and the like. Hereinafter, description will be given using the second pattern. The "occupant" in the embodiment is assumed to be, for example, an occupant seated in a driver's seat, i.e., a seat provided with a driving operating element. Although a case in which left-hand traffic regulations are applied will be described, it is only necessary to reverse the left and right when right-hand traffic regulations are applied.

Overall Configuration

Figure 1:
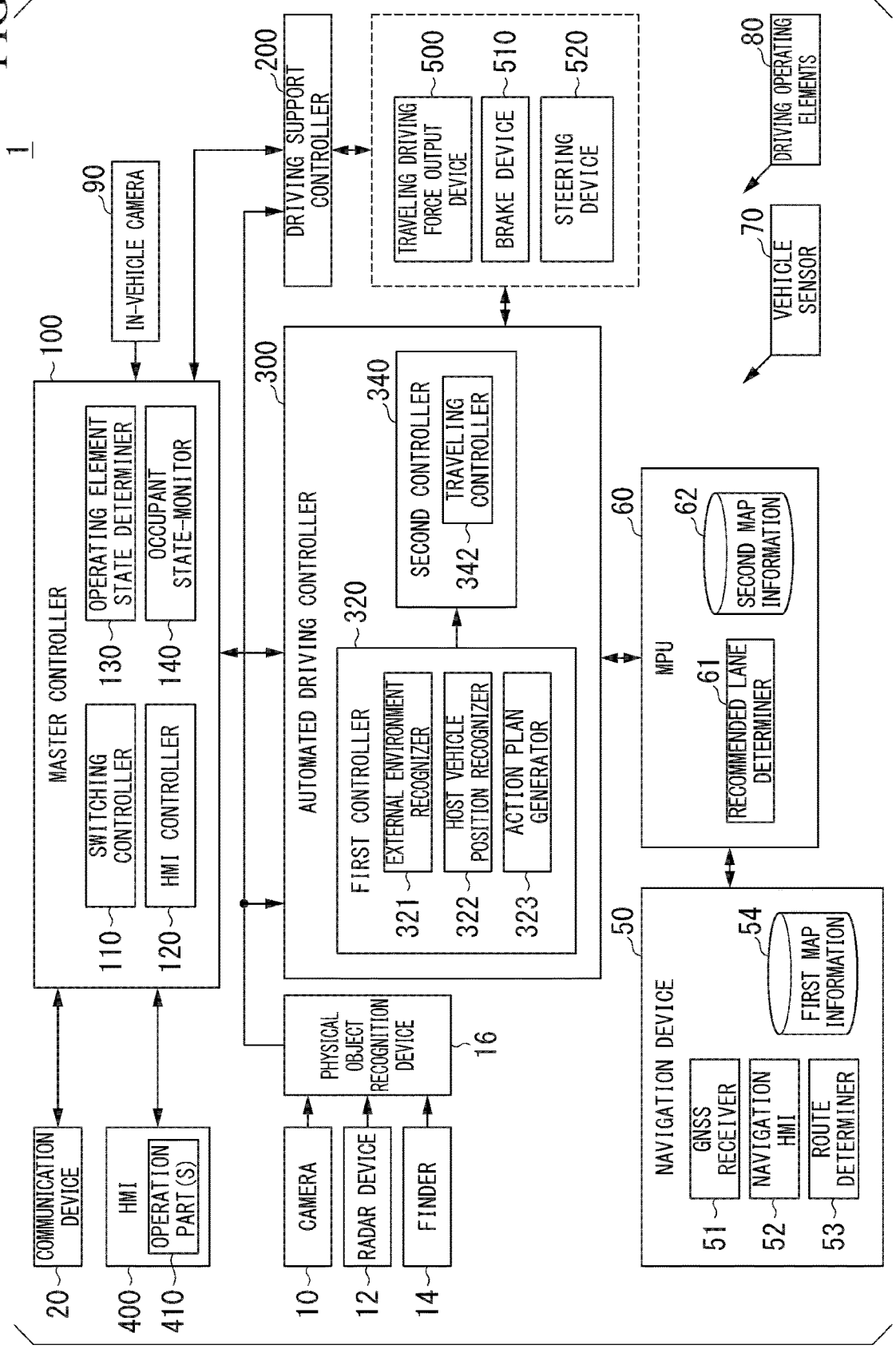
FIG. 1 is a configuration diagram of a vehicle system including a display system of an embodiment.

FIG. 1 is a configuration diagram of a vehicle system 1 including a display system of the embodiment. A vehicle equipped with the vehicle system 1 (hereinafter referred to as a "host vehicle M") is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a power generator connected to the internal combustion engine, or discharge power of a secondary battery or a fuel cell.

The vehicle system 1 includes, for example, a camera 10, a radar device 12, a finder 14, a physical object recognition device 16, a communication device 20, a navigation device 50, a map-positioning unit (MPU) 60, a vehicle sensor 70, driving operating elements 80, an in-vehicle camera 90, a master controller 100, a driving support controller 200, an automated driving controller 300, a human machine interface (HMI) 400, a traveling driving force output device 500, a brake device 510, and a steering device 520. These devices and apparatuses are connected to each other by a multiplex communication line such as a controller area network (CAN) communication line, a serial communication line, a wireless communication network, or the like. Also, the configuration illustrated in FIG. 1 is merely an example, and a part of the configuration may be omitted or another configuration may be further added. A combination of the HMI 400 and an HMI controller 120 is an example of the "display system". The HMI 400 is an example of a "display". A combination of a switching controller 110, the driving support controller 200, and the automated driving controller 300 is an example of a "driving controller". The HMI controller 120 is an example of a "display controller". A combination of an operating element state determiner 130 and an occupant state-monitor 140 is an example of an "occupant situation acquirer".

The camera 10 images the vicinity of the host vehicle M and generates a captured image. For example, the camera 10 is a digital camera using a solid-state imaging device such as a charge-coupled device (CCD) or a complementary metal-oxide-semiconductor (CMOS). The camera 10 is attached to any position on the host vehicle M on which the vehicle system 1 is mounted. The vicinity of the host vehicle M may include a view in front of the host vehicle M and may include a view to the side or a view to the rear of the host vehicle M. When the view in front thereof is imaged, the camera 10 is attached to an upper portion of a front windshield, a rear surface of a rearview mirror, or the like. When the view to the rear thereof is imaged, the camera 10 is attached to an upper portion of a rear windshield, a back door, or the like. When the view to the side thereof is imaged, the camera 10 is attached to a door mirror or the like. For example, the camera 10 periodically and iteratively images the vicinity of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. One or more radar devices 12 are attached to any positions on the host vehicle M. The radar device 12 may detect a position and speed of the physical object in a frequency-modulated continuous-wave (FM-CW) scheme.

The finder 14 is a light detection and ranging or laser imaging detection and ranging (LIDAR) finder in which scattered light from irradiation light is measured and a distance to an object is detected. One or more finders 14 are attached to any positions on the host vehicle M.

The physical object recognition device 16 performs a sensor fusion process on detection results from some or all of the camera 10, the radar device 12, and the finder 14 to recognize a position, a type, speed, and the like of a physical object. The physical object recognition device 16 outputs recognition results to the driving support controller 200 and the automated driving controller 300.

The communication device 20 communicates with other vehicles present in the vicinity of the host vehicle M using, for example, a cellular network, a Wi-Fi network, Bluetooth (registered trademark), dedicated short-range communication (DSRC), or the like or communicates with various types of server devices via a wireless base station. The communication device 20 communicates with a terminal device possessed by a person outside the vehicle.

For example, the navigation device 50 includes a global navigation satellite system (GNSS) receiver 51, a navigation HMI 52, and a route determiner 53, and stores first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or corrected by an inertial navigation system (INS) using an output of the vehicle sensor 70. The navigation HMI 52 includes a display device, a speaker, a touch panel, keys, and the like. The navigation HMI 52 may be partly or wholly shared with an HMI 400 to be described below. For example, the route determiner 53 determines a route (for example, including information about transit points when the host vehicle M travels to a destination) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by a link. The first map information 54 may include a curvature of a road, point of interest (POI) information, and the like. A route determined by the route determiner 53 is output to the MPU 60. The navigation device 50 may perform route guidance using the navigation HMI 52 on the basis of the route determined by the route determiner 53.

For example, the MPU 60 functions as a recommended lane determiner 61, and stores second map information 62 in a storage device such as an HDD or a flash memory. The recommended lane determiner 61 divides a route on a map provided from the navigation device 50 into a plurality of blocks (for example, divides the route every 100 [m] with respect to a traveling direction of the vehicle), and determines a recommended lane for each block with reference to the second map information 62. The recommended lane determiner 61 determines what number lane the vehicle travels on from the left. The recommended lane determiner 61 determines the recommended lane so that the host vehicle M can travel along a reasonable traveling route for traveling to an interchange destination when there is an interchange in the route on the map.

The second map information 62 is map information which has higher accuracy than the first map information 54. For example, the second map information 62 includes information about a center of a lane, information about a boundary of a lane, or the like. Also, the second map information 62 may include road information, traffic regulations information, address information (an address/zip code), facility information, telephone number information, and the like. The second map information 62 may be updated at any time when the communication device 20 communicates with another device.

The vehicle sensor 70 includes a vehicle speed sensor configured to detect speed of the host vehicle M, an acceleration sensor configured to detect acceleration, a yaw rate sensor configured to detect angular speed around a vertical axis, a direction sensor configured to detect a direction of the host vehicle M, or the like.

For example, the driving operating element 80 includes an accelerator pedal, a brake pedal, a shift lever, a steering wheel, a steering wheel variant, a joystick, and other operating elements. A sensor configured to detect an amount of operation or the presence or absence of an operation is attached to the driving operating element 80, and a detection result thereof is output to the automated driving controller 300 or some or all of the traveling driving force output device 500, the brake device 510, and the steering device 520.

The in-vehicle camera 90 performs imaging centered on a face of the occupant seated on the seat installed inside the vehicle. The interior camera 90 is a digital camera using a solid-state imaging device such as a CCD or a CMOS. The in-vehicle camera 90, for example, periodically images an occupant. An image captured by the in-vehicle camera 90 is output to the master controller 100.

[Master Controller]

The master controller 100 includes, for example, the switching controller 110, the HMI controller 120, the operating element state determiner 130, and the occupant state-monitor 140. Each of these components is implemented by a hardware processor such as a central processing unit (CPU) executing a program (software). Some or all of these components are implemented, for example, by hardware (a circuit unit including circuitry) such as large-scale integration (LSI), an application-specific integrated circuit (ASIC), a field-programmable gate array (FPGA), or a graphics-processing unit (GPU) or may be implemented by cooperation between software and hardware. The program may be pre-stored in a storage device such as an HDD or a flash memory of the master controller 100 or stored in a removable storage medium such as a DVD or a CD-ROM, and installed in the HDD or the flash memory of the master controller 100 when the storage medium is mounted in a drive device.

The switching controller 110, for example, switches a driving mode on the basis of an operation signal input from a prescribed switch included in the HMI 400. The switching controller 110 may switch the driving mode on the basis of an operation for issuing an instruction for acceleration, deceleration, or steering of the driving operating element 80 such as an accelerator pedal, a brake pedal, or a steering wheel. The switching controller 110 may switch the driving mode on the basis of an action plan generated by an action plan generator 323.

When it is determined that switching from the first driving mode to the second driving mode is required on the basis of a vicinity situation of the host vehicle M, the switching controller 110 executes control for switching the driving mode of the host vehicle M from the first driving mode to the second driving mode. Details of the function of the switching controller 110 will be described below.

The HMI controller 120 causes the HMI 400 to output information about the driving mode, a notification related to switching of the driving mode, and the like. The HMI controller 120 may output the information received by the HMI 400 to one or both of the driving support controller 200 and the automated driving controller 300. Details of the function of the HMI controller 120 will be described below.

For example, the operating element state determiner 130 determines whether or not the steering wheel included in the driving operating element 80 is being operated. The state in which the steering wheel is being operated refers to a state in which an immediate operation is possible or a gripped state when an intentional operation is actually being performed. The details of the function of the operating element state determiner 130 will be described below.

The occupant state-monitor 140 monitors the state of the occupant of the host vehicle M on the basis of an image captured by the in-vehicle camera 90 and determines whether or not the occupant is monitoring the vicinity of the host vehicle M. Details of the function of the occupant state-monitor 140 will be described below. For example, each configuration of the master controller 100 described above may be provided in the automated driving controller 300.

[Driving Support Controller]

The driving support controller 200 operates, for example, an adaptive cruise control system (ACC), a lane-keeping assistance system (LKAS), and other driving support control. For example, when the ACC is executed, the driving support controller 200 controls the traveling driving force output device 500 and the brake device 510 so that the host vehicle M travels in a state in which a uniform vehicular gap between the host vehicle M and a preceding vehicle is maintained on the basis of information input via the camera 10, the radar device 12, and the finder 14 via the object recognition device 16. That is, the driving support controller 200 performs acceleration/deceleration control based on the vehicular gap with respect to the preceding vehicle. When the LKAS is operated, the driving support controller 200 controls the steering device 520 so that the host vehicle M travels while keeping a current traveling lane (lane keeping). That is, the driving support controller 200 performs steering control for keeping a lane.

[Automated Driving Controller]

The automated driving controller 300 includes, for example, a first controller 320 and a second controller 340. Each of the first controller 320 and the second controller 340 is implemented by a processor such as a CPU executing a program. Some or all of these functional units may be implemented, for example, by hardware (a circuit unit including circuitry) such as LSI, an ASIC, an FPGA, or a GPU or may be implemented by cooperation between software and hardware. The program may be pre-stored in a storage device such as an HDD or a flash memory of the automated driving controller 300 or stored in a removable storage medium such as a DVD or a CD-ROM, and installed in the HDD or the flash memory of the automated driving controller 300 when the storage medium is mounted in a drive device.

The first controller 320 includes, for example, an external environment recognizer 321, a host vehicle position recognizer 322, and an action plan generator 323. The external environment recognizer 321 recognizes positions of nearby vehicles, and states of velocity and acceleration thereof on the basis of information input from the camera 10, the radar device 12, and the finder 14 via the physical object recognition device 16. The position of a nearby vehicle may be indicated by a representative point such as a center of gravity or a corner of the nearby vehicle or may be indicated by a region represented by an outline of the nearby vehicle. The "state" of a nearby vehicle may include acceleration or a jerk of the nearby vehicle, or an "action state" thereof (for example, whether or not a lane change is being performed or intended).

The external environment recognizer 321 may recognize at least one of the above-described nearby vehicles and obstacles (for example, guardrails, utility poles, parked vehicles, and persons such as pedestrians), road shapes, and other physical objects.

For example, the host vehicle position recognizer 322 recognizes a lane (a traveling lane) on which the host vehicle M is traveling and a position and orientation of the host vehicle M relative to the traveling lane. For example, the host vehicle position recognizer 322 recognizes a traveling lane by comparing a pattern of a road-dividing line (for example, an arrangement of solid lines and broken lines) obtained from the second map information 62 with a pattern of road-dividing lines around the host vehicle M recognized from the image captured by the camera 10. The host vehicle position recognizer 322 may recognize the position and orientation of the host vehicle M with respect to the traveling lane.

The action plan generator 323 generates an action plan for the host vehicle M to perform automated driving to a destination or the like. For example, the action plan generator 323 determines events to be sequentially executed in the automated driving control so that the host vehicle M travels on a recommended lane determined by the recommended lane determiner 61 and copes with situations in the vicinity of the host vehicle M. The events in automated driving include events accompanied by a change in behavior of the host vehicle M and events unaccompanied by a change in behavior of the host vehicle M. The events accompanied by a change in behavior of the host vehicle M include, for example, a lane-change event for changing a traveling lane of the host vehicle M, an overtaking event for overtaking a preceding vehicle, a junction event for causing the vehicle to merge at a junction of a road, an interchange event for causing the host vehicle M to travel in a target direction at an interchange, a right/left turn event for causing the host vehicle M to turn left or right at a crossroad, and an emergency stop event for causing the host vehicle M to perform emergency stopping. The events unaccompanied by a change in behavior of the host vehicle M include, for example, a constant-speed traveling event for traveling on the same traveling lane at constant speed and a low-speed following event for following a preceding vehicle with a condition of a low speed (for example, 40 [km/h] or less). Also, during execution of these events, actions for avoidance may be planned on the basis of a situation in the vicinity of the host vehicle M (presence of nearby vehicles and pedestrians, lane narrowing due to roadwork, or the like). The action plan generator 323 generates a target trajectory in which the host vehicle M will travel in the future in correspondence with the various types of events described above. The target trajectory is represented by a sequential arrangement of points (trajectory points) at which the host vehicle M is required to arrive.

The second controller 340 includes, for example, a traveling controller 342. The traveling controller 342 controls the traveling driving force output device 500, the brake device 510, and the steering device 520 so that the host vehicle M passes through the target trajectory generated by the action plan generator 323 at scheduled times.

The HMI 400 presents various types of information to the occupant within the vehicle and receives an operation input by the occupant. The HMI 400 includes, for example, some or all of various types of display devices, light-emitting units, speakers, buzzers, touch panels, various types of operating switches, keys, and the like. The HMI 400 includes, for example, an operation part(s) 410 for switching to the starting or ending of driving support or switching the driving mode. The operation part(s) 410 outputs information about switching of the driving mode to the switching controller 110, for example, by accepting a switch operation of the occupant.

The traveling driving force output device 500 outputs a traveling driving force (a torque) to driving wheels for the vehicle to travel. For example, the traveling driving force output device 500 includes a combination of an internal combustion engine, an electric motor, a transmission, and the like, and an electric controller (ECU) configured to control them. For example, the brake device 510 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the traveling controller 342 or the information input from the driving operating element 80 so that a brake torque according to a braking operation is output to each wheel. For example, the steering device 520 includes a steering ECU and an electric motor. The steering ECU drives the electric motor in accordance with the information input from the traveling controller 342 or the information input from the driving operating element 80 to change the direction of the steering wheels.

[Configuration of HMI 400]

Figure 2:
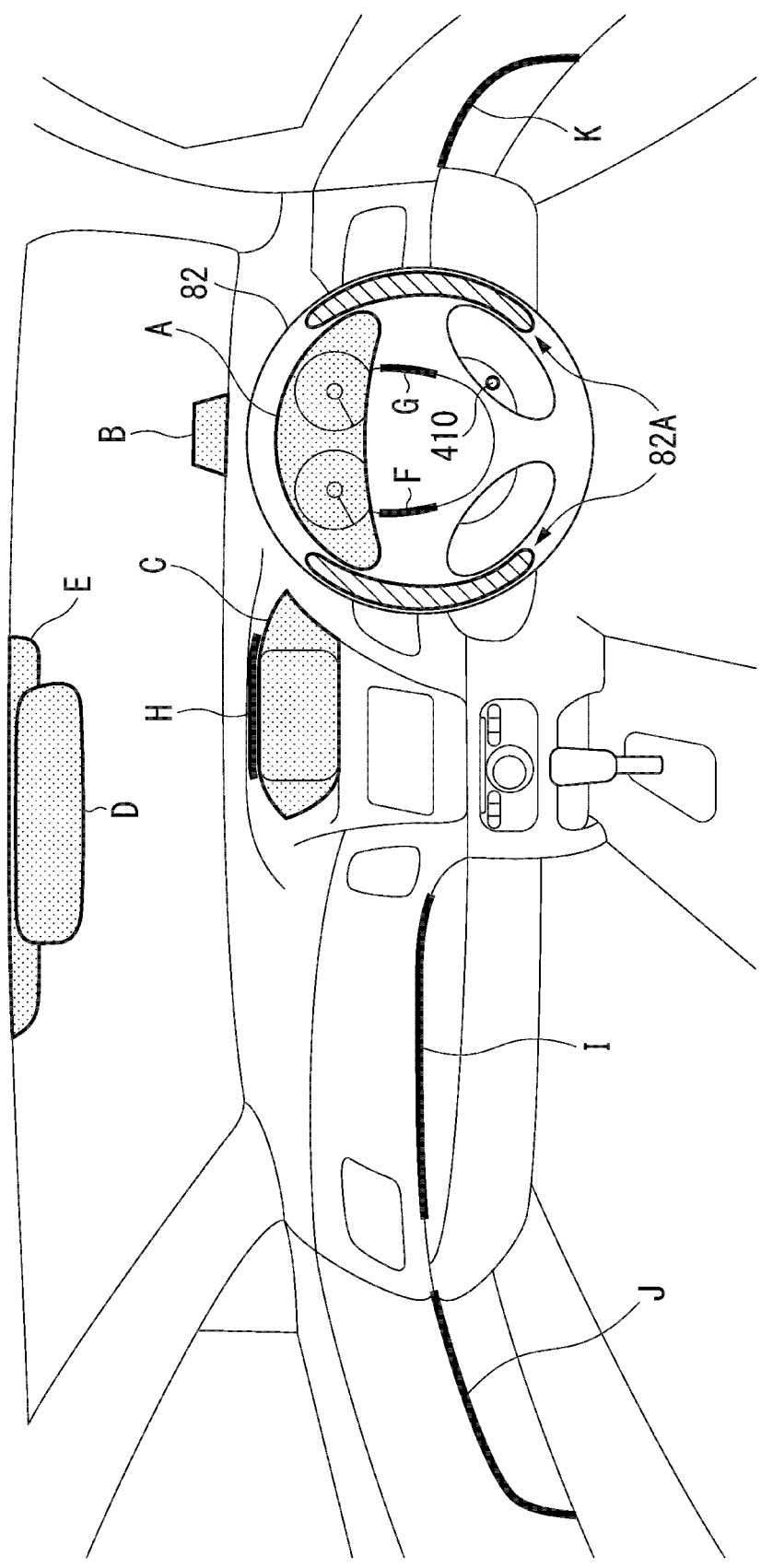
FIG. 2 is a diagram showing an example of an HMI in a host vehicle.

Hereinafter, a configuration example of the HMI 400 according to the embodiment will be described. FIG. 2 is a diagram showing an example of the HMI 400 in the host vehicle M. For example, the HMI 400 includes one or more display devices A to E and one or more light-emitting units F to K inside the host vehicle M. Here, at least one of the display devices A to E and the light-emitting units F to K is an example of a "display".

The display device A is, for example, a display device that is provided in the vicinity in front of the driver's seat on the instrument panel and can be viewed by the occupant from a gap of the steering wheel or over the steering wheel. The display device A is, for example, a liquid crystal display (LCD), an organic electro luminescence (EL) display device, or the like. The display device A displays information about the driving mode, information necessary for manual driving of the host vehicle M or traveling during automated driving, or information about an indication for the occupant. The information necessary for traveling of the host vehicle M during manual driving is, for example, speed of the host vehicle M, engine speed, the remaining amount of fuel, a radiator water temperature, a traveling distance, and other information. The information necessary for traveling of the host vehicle M during automated driving is, for example, information such as a future trajectory of the host vehicle M and indications for the occupant.

The display device B is, for example, a head-up display (HUD). The display device B is disposed at a position higher than the display device A. The display device B projects a video onto a prescribed image formation unit. For example, the display device B allows the eyes of the occupant seated in the driver's seat to view a virtual image by projecting an image onto, for example, a part of the front windshield in front of the driver's seat.

For example, the display device C is attached to a center portion of the instrument panel. The display device C is, for example, an LCD, an organic EL display device, or the like. The display device C displays, for example, an image corresponding to a navigation process to be executed by the navigation device 50. The display device C may display television programs, perform DVD reproduction, and display content such as downloaded movies.

The display device D displays a camera image obtained by photographing a view to the rear of the host vehicle M. The display device D is, for example, an LCD, an organic EL display device, or the like. In the display device D, for example, at least a part of a display surface may be a mirror.

The display device E is provided, for example, in a cover member with which the camera 10 installed on the upper portion of the front windshield to photograph a view in front of the host vehicle M is covered. The display device E is, for example, an LCD, an organic EL display device, or the like.

The light-emitting units F to K are, for example, lighting devices such as light-emitting diodes (LEDs) or indicators. For example, the light-emitting units F to K are, for example, turned on or blinked in a prescribed color in a situation in which driving support for the host vehicle M is started, a situation in which the driving mode is switched, a situation for prompting the occupant to implement a change in behavior of the host vehicle M in the second driving mode, a situation in which an operation on the driving operating element 80 is urgently performed by the occupant, or some situations in which display control to be described below is performed.

The operation part(s) 410 and the light-emitting units F and G are provided on the steering wheel 82 that is one of the driving operating elements 80. The steering wheel 82 may be provided with a grip sensor 82A that detects that the occupant has gripped the steering wheel 82.

The light-emitting unit H is provided, for example, in a part of the display device C or in the vicinity thereof. The vicinity is a range in which a shortest distance between the light-emitting unit H and the display device C is, for example, several [cm] (more specifically, about 3 cm) or less. In the example of FIG. 2, the light-emitting unit H extending along at least one side that forms a screen shape of the display device C is attached. The light-emitting unit I is provided, for example, in the vicinity in front of a passenger seat in an instrument panel. The light-emitting units J and K are provided, for example, on left- and right-front doors of the host vehicle M, respectively.

[Display Control of HMI 400 Related to Driving Support]

Next, display control of the HMI 400 related to driving support will be described. An example of the display screen shown below is a screen to be displayed on the display device A and a layout on the display screen is merely an example and can be optionally changed. The layout refers to an arrangement, a color, a scale, and others. Some or all regions of the display screen may be displayed across a plurality of display devices among the display devices A to E. The HMI controller 120 causes the HMI 400 to output information in each situation based on the driving mode for the host vehicle M. Hereinafter, display control corresponding to several situations will be described.

<Situation (1)>

Situation (1) is, for example, a situation in which the vehicle system 1 is executing the second driving mode. In this situation, driving control of ACC, LKAS, or the like is executed and an occupant is required to grip the steering wheel. A screen example of this situation is shown in FIG. 3.

Figure 3:
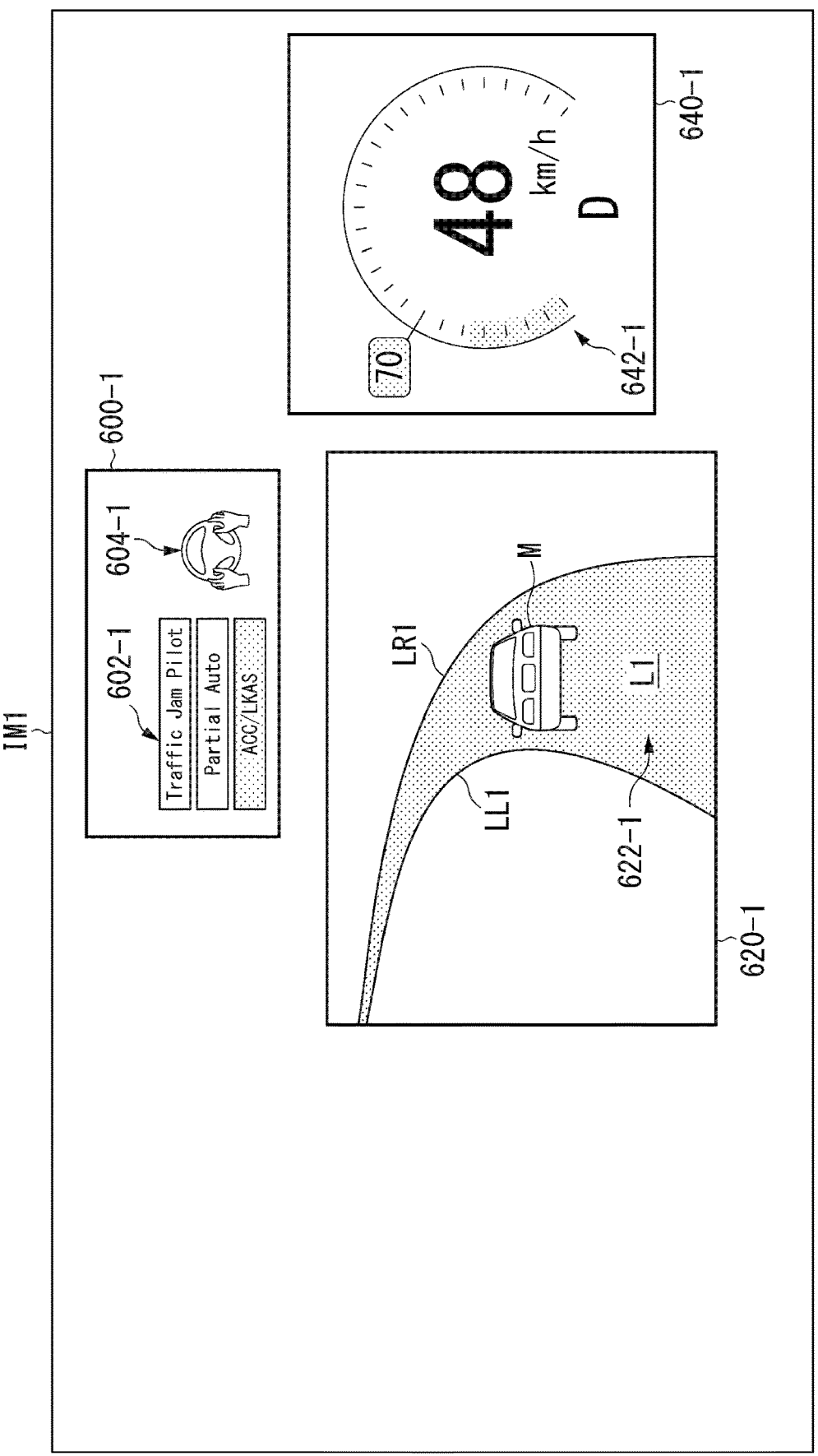
FIG. 3 is a diagram showing an example of a screen to be displayed in a situation in which a second driving mode is being executed.

FIG. 3 is a diagram showing an example of a screen IM1 displayed in a situation in which the second driving mode is being executed. The screen IM1 includes a driving support state display region 600-1, a vicinity information display region 620-1, and a traveling state display region 640-1 as regions for displaying information about driving support. Hereinafter, regions in a screen IM1-X are referred to as a driving support state display region 600-X, a vicinity information display region 620-X, and a traveling state display region 640-X.

The HMI controller 120 causes all of information indicating candidates for the state of the driving support (including automated driving) capable of being executed by the host vehicle M to be displayed in the driving support state display region 600-1. In the example of FIG. 3, images 602-1 indicating three indicators of "ACC/LKAS", "Partial Auto", and "Traffic Jam Pilot" are shown as the information indicating the candidates for the state of the driving support in the driving support state display region 600-1. For example, the driving mode is represented by each indicator alone or by a combination of a plurality of indicators.

The indicator "ACC/LKAS" indicates a state in which the host vehicle M is executing the second driving mode by driving support of ACC, LKAS, or the like or a state in which the host vehicle M can transition from the second driving mode to the first driving mode. The indicator "Partial Auto" indicates a state in which the host vehicle M is executing the driving support in the first driving mode in which the occupant does not have to perform an operation on the driving operating element 80 but the occupant is obligated to monitor the vicinity or a state in which transition to the driving support in the second driving mode is possible. It is possible to ascertain whether the host vehicle M is in a state in which driving support is being executed in the second driving mode or a state in which transition to driving support in the first driving mode is possible from a request action notification image 604 to be described below.

The indicator "Traffic Jam Pilot" (hereinafter referred to as TJP) indicates that the host vehicle M is executing driving support in TJP or is ready to transition to driving support in TJP. TJP is, for example, a control mode in which the host vehicle M follows a preceding vehicle at prescribed speed (for example, 40 [km/h]) or less. For example, TJP may be activated when the speed of the host vehicle M is less than or equal to a prescribed speed and a vehicular gap with respect to the preceding vehicle is within a prescribed distance and activated when the operation part(s) 410 accepts the operation of the occupant. It is possible to ascertain whether TJP is being executed or whether transition to the driving support of TJP is possible from the request action notification image 604.

The HMI controller 120 causes a request action notification image 604-1 to be displayed at a display position corresponding to images 602-1 in the driving support state display region 600-1. The images 602-1 are images showing three indicators "ACC/LKAS", "Partial Auto", and "Traffic Jam Pilot". Here, the term "corresponding" means a state in which there is a guideline indicating a lateral arrangement, a longitudinal arrangement, or association and a corresponding relationship can be recognized by people. As an example, the "display position corresponding to the images 602-1" is a display position adjacent to the images 602-1 and indicates a display position at a distance of several [cm] or less (for example, 3 [cm] or less)) in at least one of upward, downward, left and right directions with respect to the display position of the images 602-1. The request action notification image 604-1 is, for example, an image showing a prescribed action to be performed by the occupant on the driving operating element 80. The request action notification image 604-1 includes, for example, an image showing the driving operating element 80 and an image showing a prescribed portion of the occupant. The request action notification image 604-1 is, for example, an image schematically showing a positional relationship between the steering wheel 82 and the occupant's hand.

The HMI controller 120 causes an image simulated on a road in front of the host vehicle M acquired from the second map information 62, an image of the host vehicle M recognized by the host vehicle position recognizer 322, and an image showing a nearby vehicle recognized by the external environment recognizer 321 to be displayed in the vicinity information display region 620-1. The HMI controller 120 may cause an image showing all nearby vehicles recognized by the external environment recognizer 321 to be displayed and cause only nearby vehicles that affect a future trajectory of the host vehicle M among all the nearby vehicles to be displayed.

The HMI controller 120 causes an image 642-1 indicating the speed of the host vehicle M to be displayed in the traveling state display region 640-1. In the example of FIG. 3, an example in which acceleration from a current speed (48 [km/h]) of the host vehicle M to a target speed (for example, 70 [km/h]) determined by the action plan generator 323 in the second driving mode is performed is shown. Alternatively, the HMI controller 120 may cause information about a current gear type of the host vehicle M to be displayed in the traveling state display region 640-1. In the subsequent screen examples, because display details of the traveling state display region 640 are substantially similar, the same description will be omitted.

In situation (1), the HMI controller 120 causes an image showing an indicator of "ACC/LKAS" among images 602-1 of three indicators to be displayed in a color (a first color) different from those of other indicators in the driving support state display region 600-1. The HMI controller 120 causes the request action notification image 604-1 indicating that the hands of the occupant grip the steering wheel 82 to be displayed in the driving support state display region 600-1. At this time, the color of the request action notification image 604-1 is similar to the color of the image showing the indicator of "ACC/LKAS". For example, similar colors are classified into the same color in a 24-color phase ring of a practical color coordinate system (PCCS) and also classified into the same category in brightness or saturation.

An image of a lane L1 simulated on a road on which the host vehicle M displayed in the vicinity information display region 620-1 travels, an image of left and right road-dividing lines LL1 and LR1 that define the lane L1, and an image of the host vehicle M are shown by the HMI controller 120. The lane L1 is, for example, a recommended lane determined by the recommended lane determiner 61. The HMI controller 120 causes a region image 622-1 corresponding to the lane L1 to be displayed in a prescribed color. The region image 622-1 may show, for example, a region of about 90 [%] or more in a region defined by the road-dividing lines LL and LR. The region image 622-1 may be, for example, a region of 100 [%] (from which portions corresponding to the road-dividing lines LL1 and LR1 are excluded) or may show a region having a proportion of 90 [%] or more as a result of providing an offset between the road-dividing lines LL1 and LR1. The prescribed color is, for example, a color similar to the first color.

The HMI controller 120 may cause at least a part of the image 642-1 indicating the speed of the host vehicle to be displayed in the traveling state display region 640-1 to be displayed in a color similar to the first color. Thereby, the HMI controller 120 can easily cause the occupant to ascertain a current driving mode of the host vehicle M.

<Situation (2)>

Situation (2) is, for example, a situation in which the vehicle system 1 is traveling in the first driving mode. In this situation, the control by the automated driving controller 300 is executed and an image indicating that the occupant does not have to grip the steering wheel 82 is displayed. A screen example of this situation is shown in FIG. 4.

Figure 4:
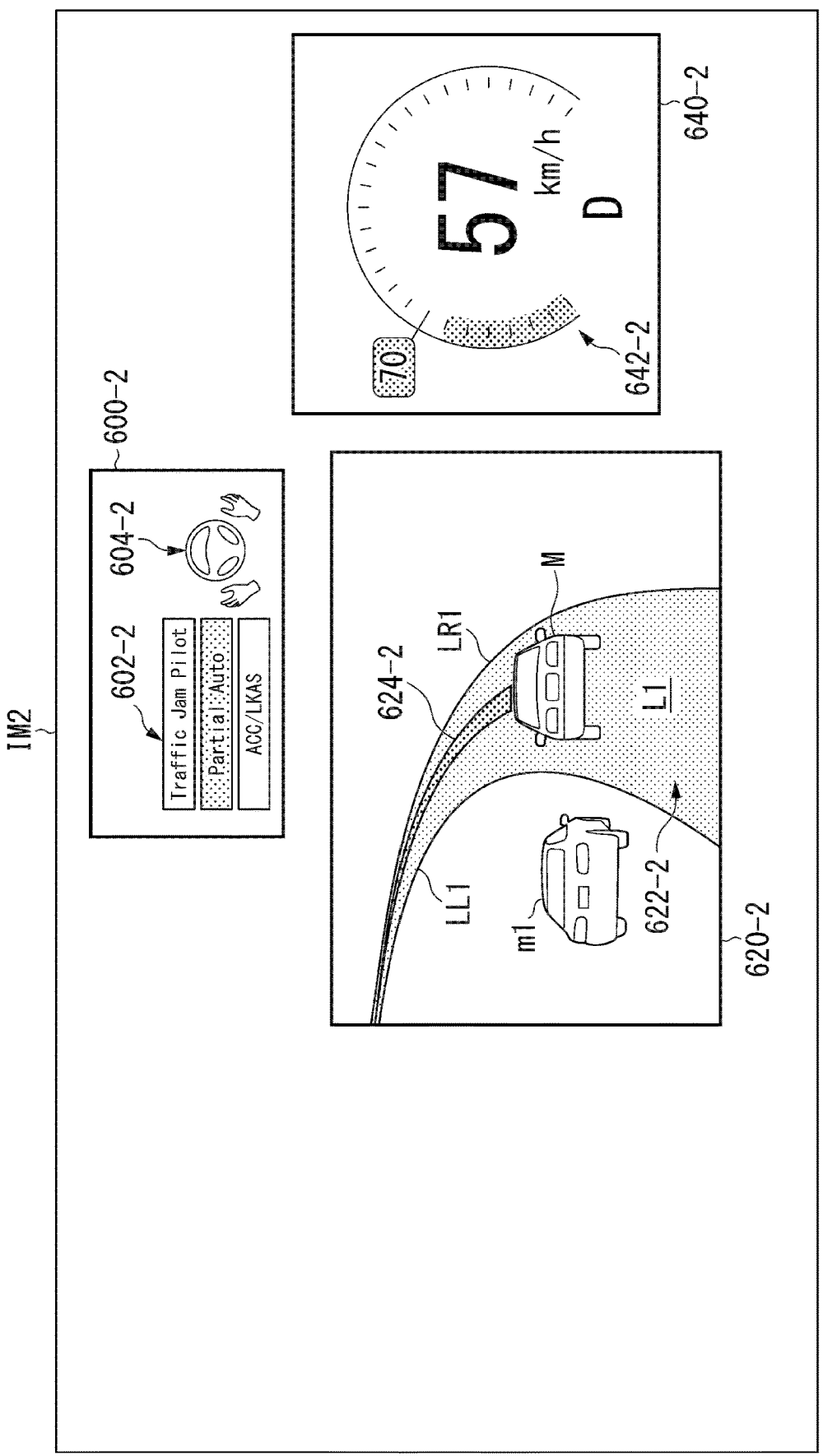
FIG. 4 is a diagram showing an example of a screen to be displayed in a situation in which traveling is being executed in a first driving mode.

FIG. 4 is a diagram showing an example of a screen IM2 displayed in a situation of traveling in the first driving mode. In situation (2), the HMI controller 120 causes an image showing an indicator of "Partial Auto" among images 602-2 of three indicators to be displayed in a color different from those of the other indicators in the driving support state display region 600-2. In this case, the HMI controller 120 causes an image showing the indicator of "Partial Auto" to be displayed in a second color different from the above-described first color in the driving support state display region 600-2. The HMI controller 120 causes a request action notification image for requesting the occupant to separate his/her hands from the steering wheel 82 to be displayed in the driving support state display region 600-2. At this time, the color of a request action notification image 604-2 may be similar to the second color.

The HMI controller 120 causes the display device A to display a region image 622-2 of a lane L1 simulated on a road on which the host vehicle M travels to be displayed in a vicinity information display region 620-2 in a color similar to the second color. Furthermore, the HMI controller 120 causes an image 624-2 of a target trajectory generated by the action plan generator 323 to be displayed in a region narrower than the lane L1. The narrower region is, for example, a region having a width of about 20 [%] with respect to the width of the lane L1. The HMI controller 120 may cause the image 624-2 to be superimposed and displayed on the image of the lane L1 and cause the image 624-2 to be three-dimensionally displayed so that the image 624-2 floats at a prescribed height from the road surface of the lane L1. The HMI controller 120 causes an image of a nearby vehicle m1 to be displayed in the vicinity information display region 620-2.

The HMI controller 120 causes the display device A to display a display color of the lane L1 and a display color of the image 624-2 showing the target trajectory in a hue that has a similar color and is easily visible to the occupant. For example, the HMI controller 120 causes the region image 622-2 of the lane L1 to be displayed in a light color of the second color and causes the image 624-2 showing the target trajectory to be displayed in a dark color of the second color.

The HMI controller 120 may cause at least a part of an image 642-2 indicating the speed of the host vehicle M to be displayed in a traveling state display region 640-2 in a color similar to the second color. Thereby, the HMI controller 120 allows the occupant to easily ascertain a difference in the driving mode by causing situation (2) to be displayed using the second color different from that of situation (1). The HMI controller 120 can improve visibility of information about the driving support and allow the occupant to visually recognize the state of driving support intuitively.

<Situation (3)>

Situation (3) is a situation in which a lane change is started, for example, when the vehicle system 1 is executing the first driving mode. In this situation, the automated driving controller 300 executes a lane-change event in the first driving mode, thereby making a lane change. A screen example of this situation is shown in FIG. 5.

Figure 5:
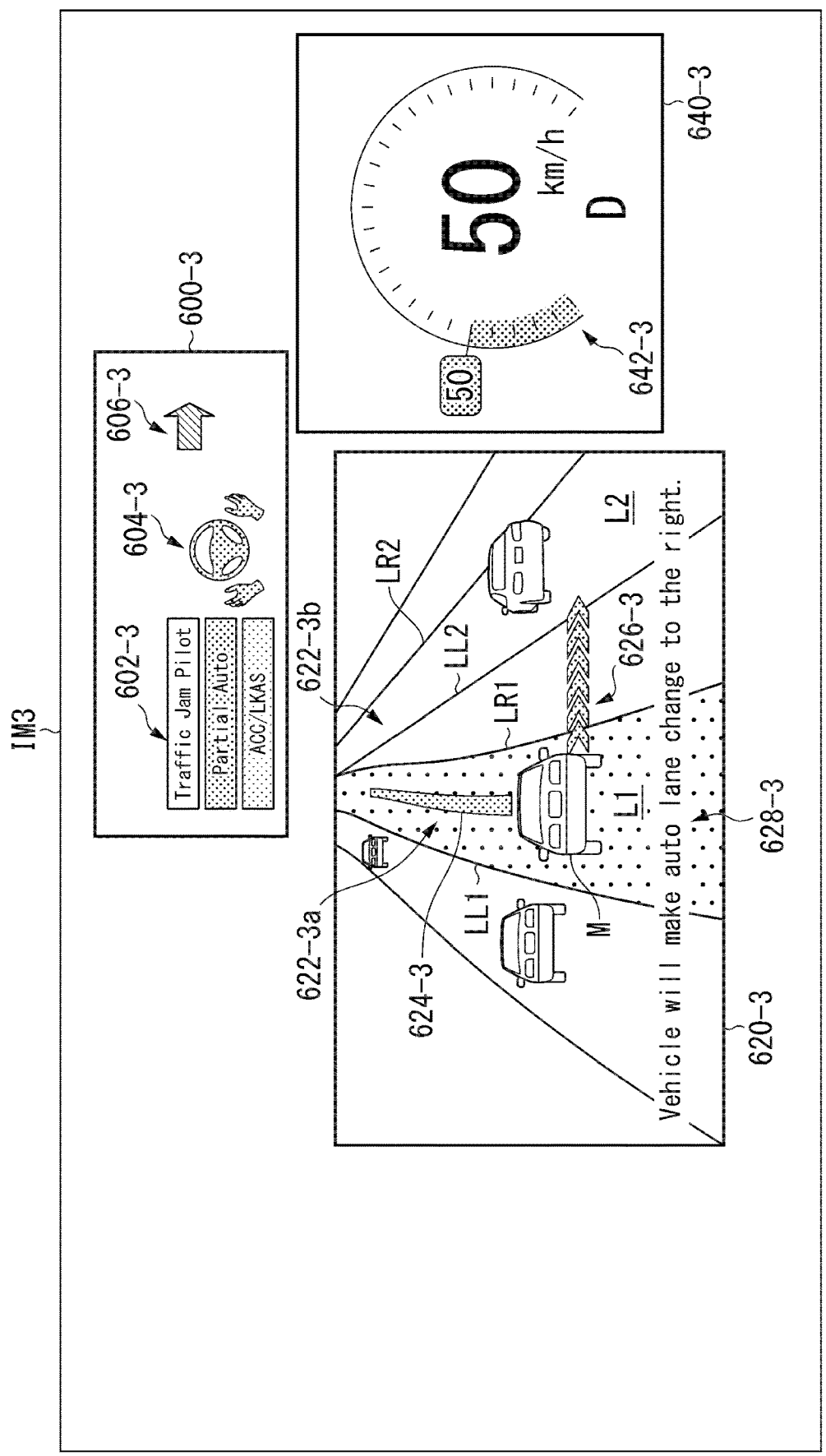
FIG. 5 is a diagram showing an example of a screen to be displayed in a situation in which a lane change is started.

FIG. 5 is a diagram showing an example of a screen IM3 to be displayed in a situation in which a lane change is started. The HMI controller 120 causes an image showing an indicator of "Partial Auto" among images 602-3 of three indicators of a driving support state display region 600-3 and a request action notification image 604-3 for requesting the occupant to separate his/her hands from the steering wheel 82 to be displayed in the second color similar to that of situation (2). The HMI controller 120 causes a turn signal indicator 606-3 indicating a direction of a route change of the host vehicle M to be displayed in the driving support state display region 600-3.

The HMI controller 120 causes an image of a lane L1 simulated on a road on which the host vehicle M travels and an image of a lane L2 simulated on a road of a lane change destination to be displayed in the vicinity information display region 620-3. The lane L2 is a region defined by road-dividing lines LL2 and LR2. The HMI controller 120 causes a region image 622-3a showing a partial region of the lane L1 on which the host vehicle M travels before the lane change is made and a region image 622-3b showing a partial region of the lane L2 for which the lane change of the host vehicle M can be made to be displayed in the vicinity information display region 620-3.

The HMI controller 120 causes an image 624-3 of a target trajectory to be displayed in the vicinity information display region 620-3. The HMI controller 120 causes a route change direction image 626-3 for providing a pre-notification of the lane change of the host vehicle M from the lane L1 to the lane L2 to be displayed in the vicinity information display region 620-3. The route change direction image 626-3 is, for example, an image that does not include text information. In the example of FIG. 5, the route change direction image 626-3 is a graphic form showing a route change direction of the host vehicle M in a road width direction. For example, the HMI controller 120 attaches an outer frame to a graphic form indicating the route change direction of the host vehicle M as the route change direction image 626-3 and causes an image of the attached outer frame to be displayed in the vicinity information display region 620-3. The HMI controller 120 may fill the inside of the graphic form surrounded by the outer frame with a prescribed color. The HMI controller 120 may cause the route change direction image 626-3 to be displayed by an animation image. The animation image is, for example, an image represented by a polygon or the like indicating the appearance of an icon, a character, a sample image, or the like. The animation image may be, for example, a still image or a moving image. The HMI controller 120 may cause a text image 628-3 for notifying the occupant that the host vehicle M changes the lane to the right lane to be displayed in the vicinity information display region 620-3. Through these displays, the occupant can ascertain the lane L2 of the lane change destination before the behavior of the host vehicle M changes due to the lane change.

Here, when it is determined that the lane change from the lane L1 to the lane L2 is made, the automated driving controller 300 implements a lane change by causing the host vehicle M to travel along a target trajectory generated for changing the lane to the lane L2. On the other hand, the automated driving controller 300 determines whether or not switching from the first driving mode to the second driving mode is required before the lane change is completed and the switching controller 110 causes control for switching from the first driving mode to the second driving mode to be executed when it is determined that switching to the second driving mode is required. A situation in which switching from the first driving mode to the second driving mode is required is, for example, a situation in which there is an obstacle such as a nearby vehicle, a situation in which visibility is deteriorated, or a situation in which congestion occurs and therefore the first driving mode cannot be continued.

<Situation (4)>

For example, situation (4) is a situation in which, because there are a plurality of nearby vehicles in the vicinity of the host vehicle M, the lane change cannot be made and a screen for prompting the occupant to execute the second driving mode according to his/her operation is displayed. A screen example of this situation is shown in FIG. 6.

Figure 6:
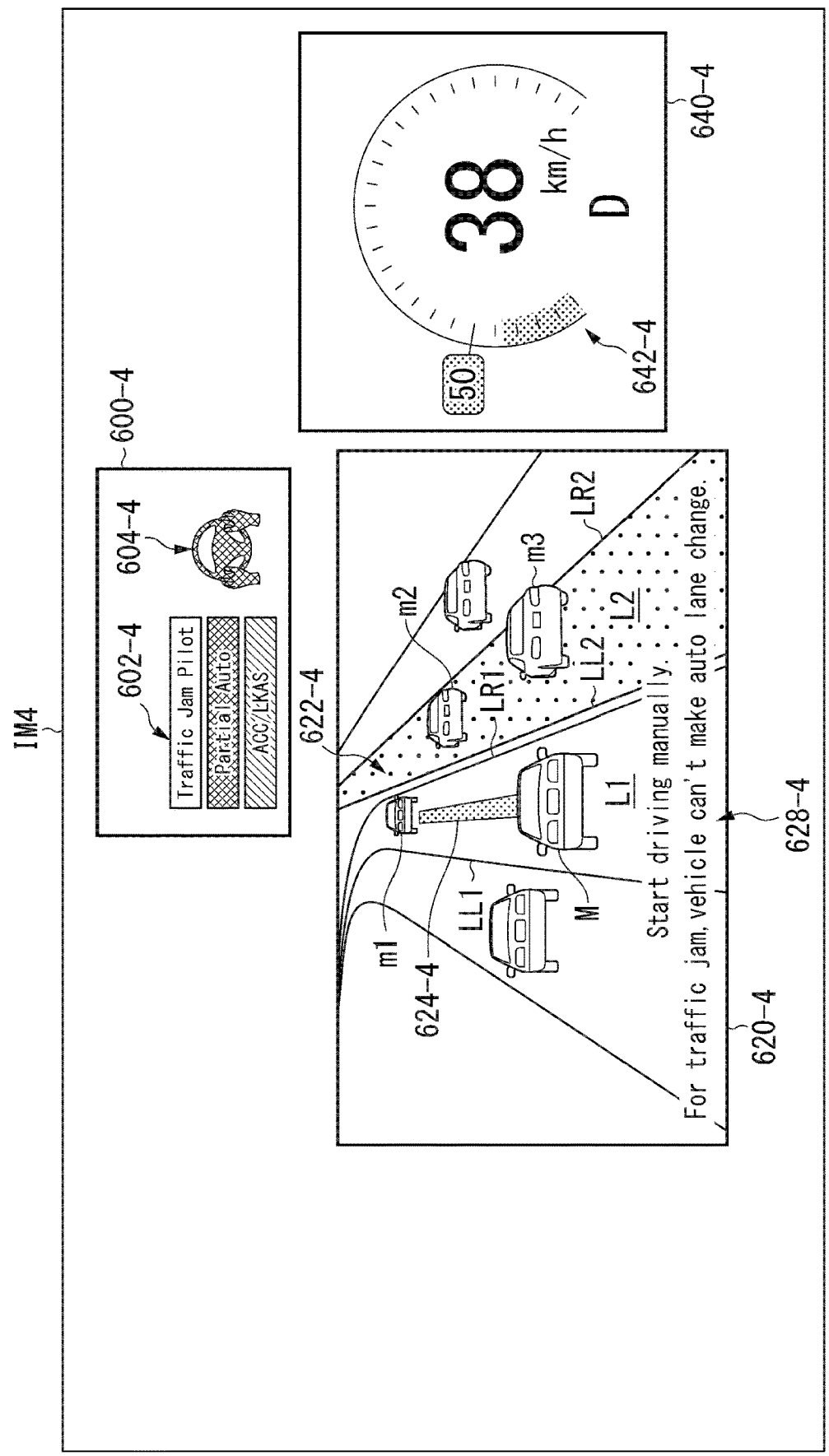
FIG. 6 is a view showing an example of a screen for prompting an occupant to execute the second driving mode according to the occupant's operation.

FIG. 6 is a diagram showing an example of a screen IM4 for prompting the occupant to execute the second driving mode according to his/her operation. In situation (4), the HMI controller 120 causes an image indicating an indicator of "Partial Auto" among images 602-4 of three indicators to be displayed in a driving support state display region 600-4 in a color (a third color) that is different from the first and second colors and different from those of the other indicators. The HMI controller 120 causes an image indicating the indicator of "ACC/LKAS" to be displayed in a color (a fourth color) different from those of the other indicators. Further, the HMI controller 120 causes a request action notification image 604-4 for prompting the occupant to grip the steering wheel 82 to be displayed in the driving support state display region 600-4. At this time, the color of a request action notification image 604-4 is similar to the third color.

The HMI controller 120 causes an image 622-4 indicating a traveling region on an image of a lane L2 to be displayed in the vicinity information display region 620-4. The HMI controller 120 causes an image 624-4 indicating a current target trajectory to be displayed in the vicinity information display region 620-4.

The HMI controller 120 may cause switching from the first driving mode to the second driving mode to be required or a text image 628-4 for prompting the occupant to execute the manual driving to be displayed in the vicinity information display region 620-4. In the example of FIG. 6, because it is not possible to make an automated lane change due to congestion, the text image 628-4 for prompting the occupant to start the manual driving is displayed.

The HMI controller 120 may cause an image of a nearby vehicle which is the reason that the first driving mode cannot be executed to be displayed so that the image can be distinguished from images of other nearby vehicles. In the example of FIG. 6, images of nearby vehicles m1 to m3 which are the reason that the lane change in the first driving mode cannot be executed are displayed so that the nearby vehicles m1 to m3 can be distinguished from other nearby vehicles. Distinguishably performing display refers to, for example, performing display in a color different from those of other nearby vehicles or display in a blinking manner. Thereby, the HMI controller 120 can clearly notify the occupant of a current situation and a reason that the manual driving is performed.

<Situation (5)>

Situation (5) is, for example, a situation immediately after switching from the first driving mode to the second driving mode. In this situation, manual driving of the host vehicle M is executed according to the occupant's operation and driving support of ACC, LKAS, or the like is executed. A screen example of this situation is shown in FIG. 7.

Figure 7:
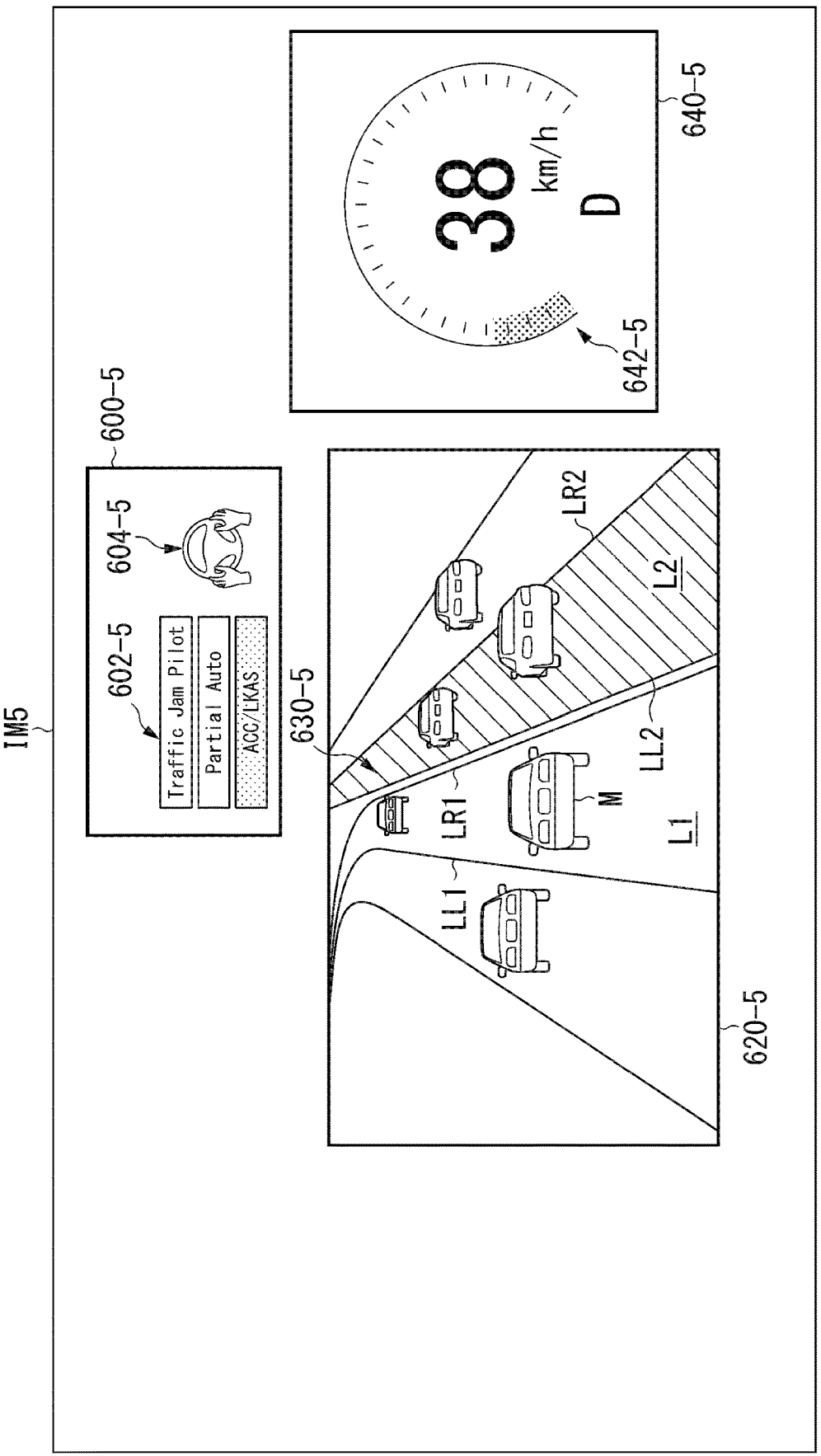
FIG. 7 is a diagram showing an example of a screen to be displayed during traveling in the second driving mode.

FIG. 7 is a diagram showing an example of a screen IM5 to be displayed during traveling in the second driving mode. The HMI controller 120 causes an image showing an indicator of "ACC/LKAS" among images 602-5 of three indicators to be displayed in a different color from the other indicators in a driving support state display region 600-5. Thereby, the HMI controller 120 can notify the occupant that the second driving mode is being executed, but driving support of ACC and LKAS is being executed.

When switching from the first driving mode to the second driving mode is performed before completion of the lane change event, the HMI controller 120 causes a region image 630-5 of a region of a lane L2 that is a lane change destination set during execution of the first driving mode to be displayed in a color (a fifth color) different from those of the other lanes in the vicinity information display region 620-5. The term "before completion of the lane change event" is, for example, a state before the entire host vehicle M is included within the region of the lane L2 of the lane change destination after the lane-change event is started and also includes a state before behavior of the host vehicle M changes in a direction of the lane L2. The region image 630-5 is an example of a graphic form. Thereby, even when switching to the second driving mode has been performed during the event of the first driving mode, it is possible to notify the occupant of a recommended driving lane of the host vehicle M set in the first driving mode.

<Situation (6)>

For example, situation (6) is a situation in which a change in behavior executed by the driving controller (for example, the driving support controller 200 or the automated driving controller 300) is implemented by the occupant's manual driving if the lane-change event is continued in the first driving mode after the mode is switched to the second driving mode. In this situation, a situation after the operating element state determiner 130 detects that the occupant is gripping the steering wheel 82 with the grip sensor 82A and the occupant state-monitor 140 determines that a line of sight of the occupant views a traveling direction of the host device M (in other words, the vicinity is monitored) is shown. In this situation, it is assumed that the host vehicle M is driven according to the occupant's operation, and driving support of ACC, LKAS, or the like is also executed. A screen example of this situation is shown in FIG. 8

Figure 8:
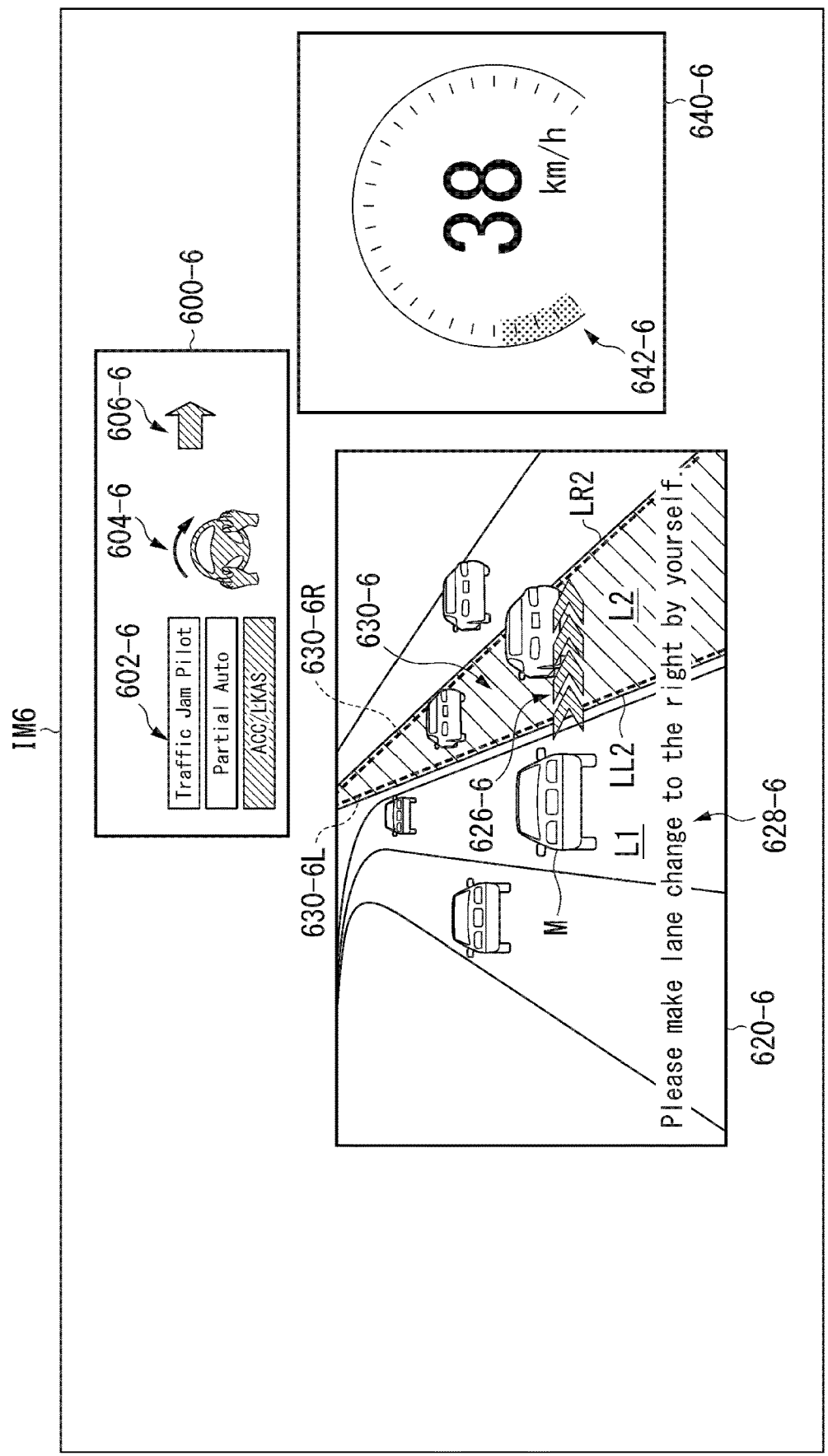
FIG. 8 is a diagram showing an example of a screen to be displayed to implement a change in behavior of a host vehicle M due to a lane-change event according to the occupant's operation.

FIG. 8 is a diagram showing an example of a screen IM6 to be displayed to implement a change in the behavior of the host vehicle M due to the lane-change event according to the occupant's operation. In situation (6), the HMI controller 120 causes an image showing an indicator of "ACC/LKAS" among images 602-6 of three indicators to be displayed in a color (a sixth color) different from the color displayed in the above-described situation and different from those of the other indicators in a driving support state display region 600-6. Furthermore, the HMI controller 120 causes a request action notification image 604-6 for prompting the occupant to make a right turn while gripping the steering wheel 82 with his/her hands to be displayed in the driving support state display region 600-6. In this case, the HMI controller 120 causes the color of the request action notification image 604-6 to be displayed in a color similar to the sixth color. The HMI controller 120 may cause a turn signal indicator 606-6 indicating an operated direction of a route change of the host vehicle M to be displayed when a turn signal operation is performed according to the occupant's operation.

If the lane-change event is continued, the HMI controller 120 causes a region image 630-6 in which a region of a lane L2 of a lane change destination indicating a change in the behavior executed by the driving controller is emphasized to be displayed in the vicinity information display region 620-6. The region image 630-6 is an example of a graphic form. In the region image 630-6, for example, straight-line images 630-6L and 630-6R along road-dividing lines may be included so that left and right road-dividing lines LL2 and LR2 that define the lane L2 are emphasized.

The HMI controller 120 may cause a route change direction image 626-6 for prompting the occupant to change the lane of the host vehicle M to the lane L2 to be displayed in the vicinity information display region 620-6. The HMI controller 120 may cause the colors of the region image 630-6 and the route change direction image 626-6 to be displayed as colors similar to the sixth color. The HMI controller 120 may cause a text image 628-6 for prompting the occupant to change the lane of the host vehicle M to the right lane to be displayed in the vicinity information display region 620-6 according to the occupant's operation. Thereby, even when the driving mode is switched to the second driving mode before the completion of the event executed in the first driving mode, the occupant can ascertain the situation of the host vehicle M in detail. If the lane-change event is continued in the first driving mode, the change in the behavior executed by the driving controller can be implemented according to the occupant's manual driving.

For example, when the remaining distance of a lane-changeable distance is less than or equal to a prescribed distance or when it is estimated that it is preferable to rapidly make the lane change because a congestion distance of the lane L2 of the lane change destination is greater than or equal to a prescribed length or the like, the HMI controller 120 may cause information for prompting the occupant to perform manual driving to be emphasized and output from the HMI 400 on the basis of a degree of urgency. The degree of urgency is, for example, a value that increases as the remaining distance of the lane-changeable distance decreases or as the congestion distance increases. To emphasize and output the information is, for example, to cause a sound such as a warning sound to be output from a speaker of the HMI 400 or cause the request action notification image 604-6, the region image 630-6, the route change direction image 626-6, the text image 628, and the like to be displayed in colors different from the sixth color or to be displayed in a blinking manner. The HMI controller 120 may further shorten an interval at which the request action notification image 604-6, the region image 630-6, the route change direction image 626-6, the text image 628, and the like are blinked when the degree of urgency becomes higher. The HMI controller 120 may cause at least one of the light-emitting units F to K to emit light or blink when the degree of urgency is greater than or equal to a prescribed value. Thereby, the HMI controller 120 can easily allow the occupant to ascertain high urgency of execution of the manual driving such as a lane change.

When the occupant has turned the steering wheel 82 to the right according to manual driving and the behavior of the host vehicle M has been moved by a prescribed distance from the lane L1 to the lane L2 side, the driving support controller 200 may temporarily terminate driving support of ACC and LKAS. In this case, the HMI controller 120 causes the image showing the indicator of "ACC/LKAS" among the images 602-6 of three indicators to be displayed in a color similar to those of the other indicators.

When the lane change to the lane L2 has been completed (for example, when the entire host vehicle M is included in the region within the lane L2), the driving support controller 200 may start driving support of ACC and LKAS again. In this case, the HMI controller 120 causes the image showing the indicator of "ACC/LKAS" to be displayed in a color similar to the sixth color again.

In a case in which the lane change is impossible due to congestion or the like and the lane change is not accompanied by a change in the behavior of the host vehicle M, the automated driving controller 300 executes the low-speed following event in the first driving mode. In this case, the HMI controller 120 causes an image indicating the indicator of "Traffic Jam Pilot" among images 602 of three indicators to be displayed in a color different from those of the other indicators. The HMI controller 120 causes a request action notification image for separating the occupant's hands from the steering wheel to be displayed in the driving support state display region 600. The HMI controller 120 causes a region image 622 of a lane L1 simulated in the road on which the host vehicle M travels to be displayed in the vicinity information display region 620 and causes an image 624 of a target trajectory to be displayed in a region narrower than the lane L1.

Modified Example

When switching control from the first driving mode to the second driving mode is performed before completion of the right/left turn event in place of the lane change event, the HMI controller 120 may cause the display device A to display information for prompting the occupant to implement the change in the behavior executed by the driving controller in the second driving mode if the right/left turn event is continued in the first driving mode.

Figure 9:
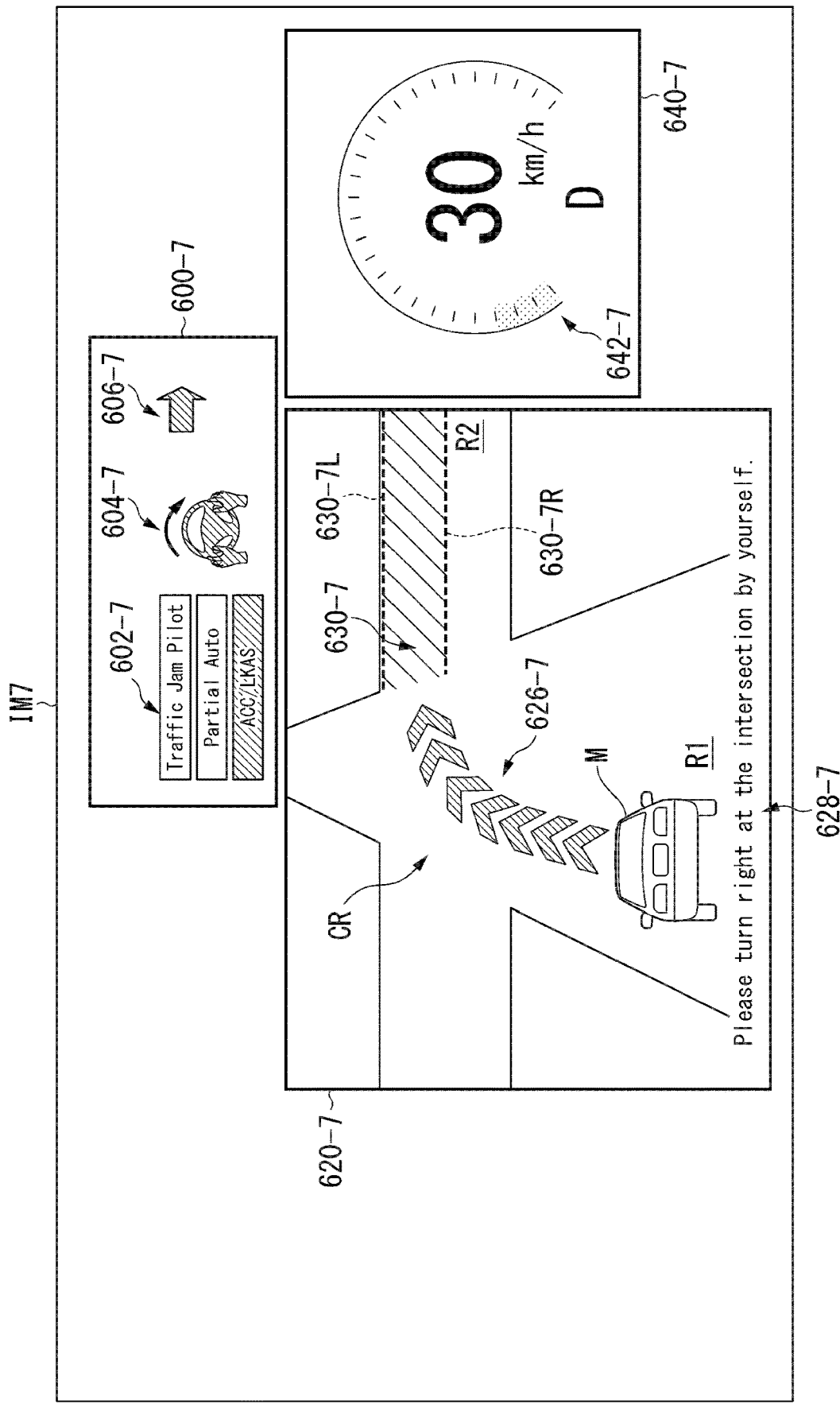
FIG. 9 is a diagram showing an example of a screen to be displayed to implement a change in behavior of the host vehicle M due to a right/left turn event according to the occupant's operation.

FIG. 9 is a diagram showing an example of a screen IM7 to be displayed to implement a change in the behavior of the host vehicle M due to the right/left turn event according to the occupant's operation. In the example of FIG. 9, it is assumed that a road R1 on which the host vehicle M travels and a road R2 of a right turn destination of the host vehicle intersect at an intersection CR and the host vehicle M is switched to the manual driving of the second driving mode before completion of the right/left turn event in which a right turn is made at the intersection CR in the first driving mode.

In this case, the HMI controller 120 causes an image showing an indicator of "ACC/LKAS" among images 602-7 of three indicators to be displayed in a driving support state display region 600-7 in a color different from those of the other indicators. Furthermore, the HMI controller 120 causes a request action notification image 604-7 for prompting the occupant to make a right turn while gripping the steering wheel 82 with his/her hands to be displayed in the driving support state display region 600-7. In this case, the HMI controller 120 causes the color of the request action notification image 604-7 to be displayed in a color similar to the color of the image indicating the indicator of "ACC/LKAS". The HMI controller 120 may cause a turn signal indicator 606-7 indicating an operated direction of a route change of the host vehicle M to be displayed when a turn signal operation is performed according to the occupant's operation.

The HMI controller 120 causes a region image 630-7 for emphasizing the traveling region on a road R2 of a right turn destination to be displayed in a vicinity information display region 620-7. The region image 630-7 includes straight-line images 630-7L and 630-7R of dotted lines along road-dividing lines so that left and right road-dividing lines defining the traveling region are emphasized.

The HMI controller 120 may cause a route change direction image 626-7 for causing the host vehicle M to make a right turn at an intersection CR1 according to the occupant's operation to be displayed in the vicinity information display region 620-7. The HMI controller 120 may cause the colors of the region image 630-7 and the route change direction image 626-7 to be displayed as colors similar to the color of the image indicating the indicator of "ACC/LKAS". The HMI controller 120 may cause a text image 628-7 for causing the host vehicle M to make a right turn at the intersection CR1 according to the occupant's operation to be displayed in the vicinity information display region 620-7. Thereby, even when the driving mode is switched to the second driving mode before the completion of the event executed in the first driving mode, the occupant can ascertain the situation of the host vehicle M in detail. If the event is continued in the first driving mode, it is possible to implement the change in the behavior executed by the driving controller according to the occupant's manual driving. Thereby, it is possible to implement smooth switching of driving.

[Processing Flow]

Figure 10:
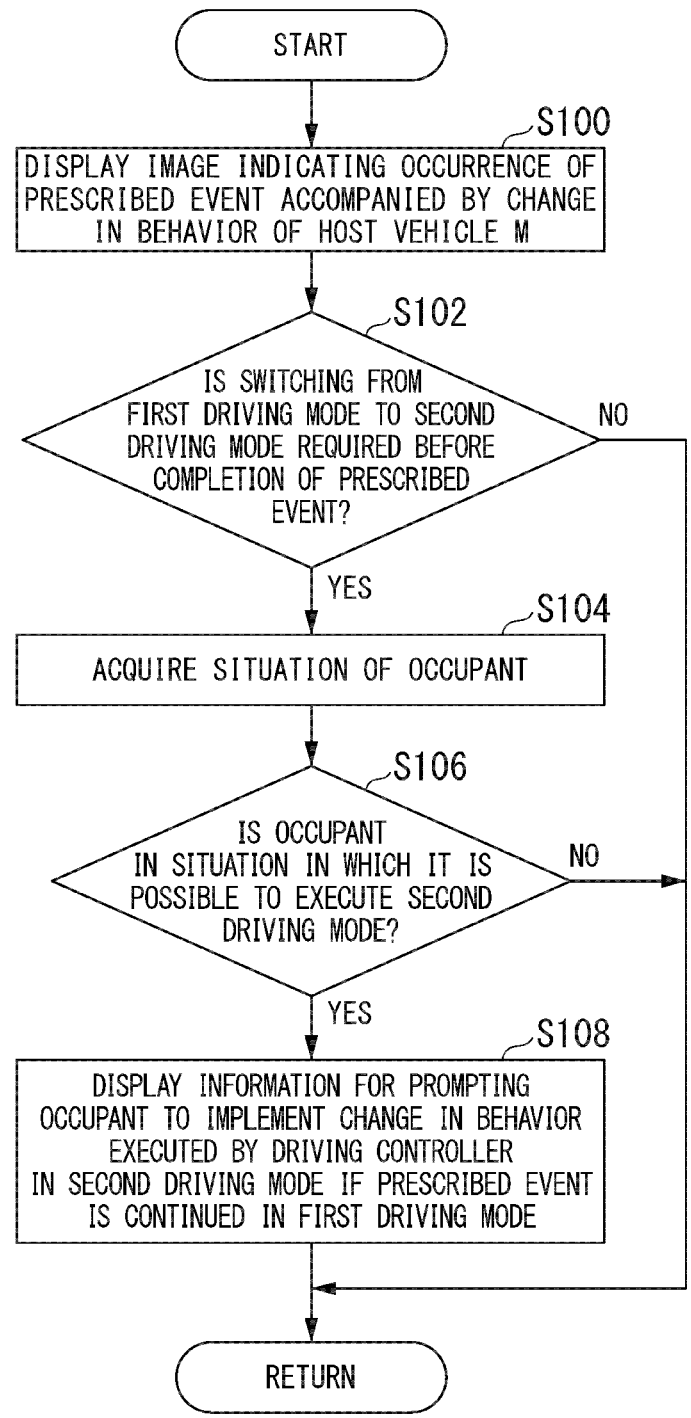
FIG. 10 is a flowchart showing an example of a flow of a process to be executed by a master controller.

FIG. 10 is a flowchart showing an example of a flow of a process to be executed by the master controller 100. For example, the process of FIG. 10 is iteratively executed at a prescribed timing. It is assumed that the automated driving has already been executed in the first driving mode before the start of the process shown in FIG. 10.

First, the HMI controller 120 determines whether or not switching from the first driving mode to the second driving mode is required before completion of a prescribed event accompanied by a change in the behavior of the host vehicle M to be executed in the first driving mode (step S102). When it is determined that the switching from the first driving mode to the second driving mode is required before the completion of the prescribed event, the switching controller 110 acquires a situation of the occupant on the basis of a determination result of the operating element state determiner 130 and a monitoring result of the occupant state-monitor 140 (step S104). Next, the switching controller 110 determines whether or not the occupant is in a situation in which it is possible to execute the second driving mode (step S106).

When the occupant is in a situation in which it is possible to execute the second driving mode, the HMI controller 120 causes the display device A to display information for prompting the occupant to implement the change in the behavior executed by the driving controller in the second driving mode if a prescribed event is continued in the first driving mode (step S108). Thereby, the present flowchart ends. When it is determined that switching from the first driving mode to the second driving mode is not required before the event is completed in the processing of step S102 or when it is determined that the occupant is not in a situation in which it is possible to execute the second driving mode in the processing of step S106, the process of the present flowchart ends without displaying information for prompting the occupant to implement a change in the behavior of the host vehicle M, which occurs when the prescribed event has been continued, in the second driving mode.

According to the embodiment described above, it is possible to allow the occupant to view driving details to be performed by the occupant after switching of driving by allowing the occupant to execute the second driving mode and displaying a screen for implementing a change in behavior of the host vehicle M executed due to the event according to the occupant's manual driving before completion of the event accompanied by the change in the behavior of the host vehicle M. Therefore, it is possible to implement smooth switching of driving. The occupant can implement a suitable driving operation on the basis of a vicinity situation.

In the present embodiment, when it is determined that switching from the first driving mode to the second driving mode is required before completion of an event with respect to the event accompanied by a change in behavior of the host vehicle M due to acceleration/deceleration of the host vehicle M in place of or in addition to an event accompanied by a change in behavior of the host vehicle M due to steering, information for prompting the occupant to implement a change in the behavior executed by the driving controller in the second driving mode may be displayed on a display if a prescribed event is continued in the first driving mode.

[Hardware Configuration]

Figure 11:
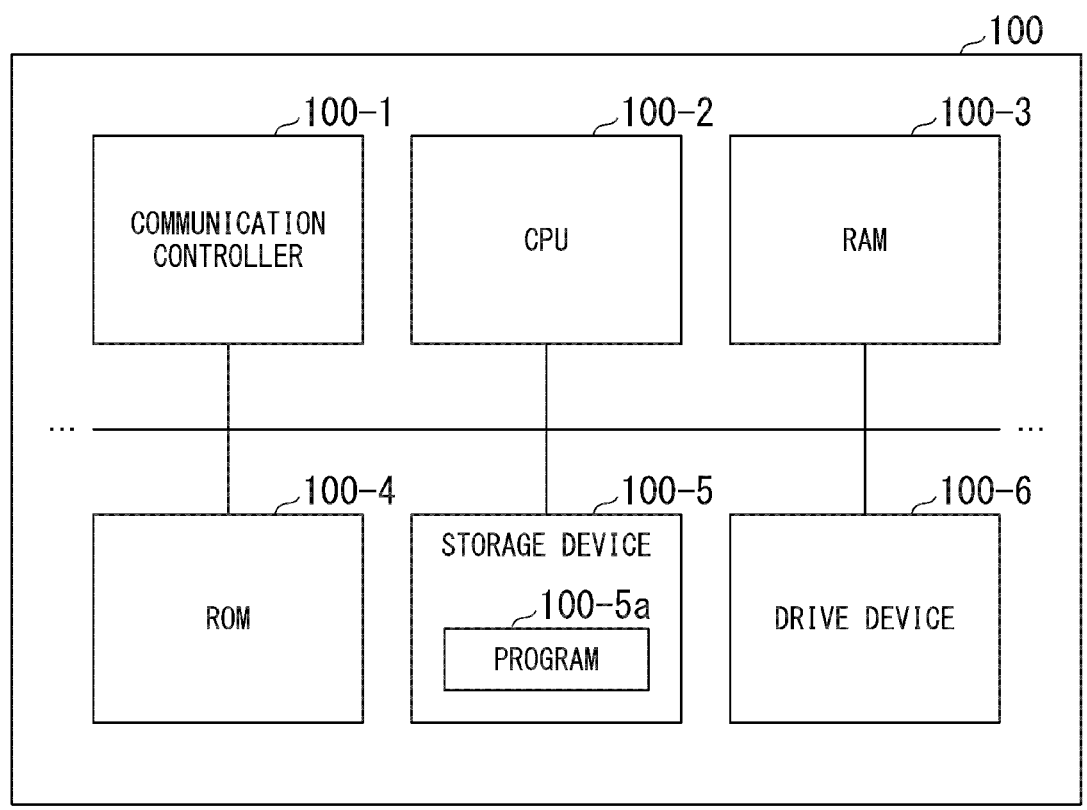
FIG. 11 is a diagram showing an example of a hardware configuration of the master controller.

FIG. 11 is a diagram showing an example of a hardware configuration of the master controller 100. As shown, the master controller 100 has a configuration in which a communication controller 100-1, a CPU 100-2, a RAM 100-3 used as a working memory, a ROM 100-4 storing a boot program and the like, a storage device 100-5 such as a flash memory or an HDD, a drive device 100-6, and the like are mutually connected by an internal bus or a dedicated communication line. The communication controller 100-1 communicates with other components than the master controller 100. A program 100-5a executed by the CPU 100-2 is stored in the storage device 100-5. This program is loaded to the RAM 100-3 by a direct memory access (DMA) controller (not shown) or the like and executed by the CPU 100-2. Thereby, some or all of the switching controller 110, the HMI controller 120, the operating element state determiner 130, and the occupant state-monitor 140 of the master controller 100 are implemented. For example, the hardware configuration shown in FIG. 12 similarly applies to the driving support controller 200 and the automated driving controller 300.

The above-described embodiment can be represented as follows.

A display system, including:
a storage device configured to store a program; and
a hardware processor,
wherein the hardware processor executes the program stored in the storage device to:
display an image on a display, execute driving control including a first driving mode in which one or both of steering and acceleration/deceleration of a vehicle are controlled on the basis of a prescribed event accompanied by a change in behavior of the vehicle or a second driving mode in which a degree of reliance on an operation of an occupant of the vehicle is greater than that in the first driving mode,
 cause the display to display an image indicating the occurrence of the prescribed event to be executed in the first driving mode at a timing before the behavior of the vehicle changes, and
 cause the display to display information for prompting the occupant to implement the change in the behavior executed by the driving control in the second driving mode if the prescribed event is continued in the first driving mode when it is determined that switching from the first driving mode to the second driving mode is required before completion of the prescribed event.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A display system, comprising:
a display configured to display an image;
a driving controller configured to execute a first driving mode in which steering of a vehicle are controlled without depending on an operation of an occupant on the basis of a prescribed event accompanied by a change in behavior of the vehicle or a second driving mode in which steering of the vehicle depending on the operation of the occupant is required; and
a display controller configured to control the display,
wherein the display controller causes the display to display an image indicating the occurrence of the prescribed event to be executed in the first driving mode at a timing before the behavior of the vehicle changes, and
wherein, when the driving controller determines that switching from the first driving mode to the second driving mode is required before completion of the prescribed event, the display controller causes the display to display information for prompting the occupant to implement the change in the behavior executed by the driving controller in the second driving mode if the prescribed event is continued in the first driving mode.

2. The display system according to claim 1, further comprising an occupant situation acquirer configured to acquire a situation of the occupant,
wherein, when the situation of the occupant acquired by the occupant situation acquirer is a situation in which it is possible to execute the second driving mode, the display controller causes the display to display information for prompting the occupant to execute the change in the behavior executed by the driving controller in the second driving mode if the event is continued in the first driving mode.

3. The display system according to claim 1, wherein the display controller causes the display to display a reason that the switching to the second driving mode is required when it is determined that the switching from the first driving mode to the second driving mode is required before the completion of the prescribed event.

4. The display system according to claim 1, wherein the event includes an event for changing a lane of the vehicle.

5. The display system according to claim 1, wherein the information for prompting the occupant to implement the change in the behavior of the vehicle according to the event in the second driving mode includes a graphic form indicating a region corresponding to a recommended traveling lane of the vehicle set when the first driving mode is executed and a graphic form indicating a route change direction of the vehicle.

6. The display system according to claim 1, wherein the display controller causes the display to display emphasized information obtained by emphasizing information for prompting the occupant to execute the change in the behavior of the vehicle according to the event in the second driving mode on the basis of a degree of urgency for executing the event.

7. A display method, comprising:
displaying, by a display system, an image on a display;
executing, by the display system, driving control including a first driving mode in which steering of a vehicle are controlled without depending on an operation of an occupant on the basis of a prescribed event accompanied by a change in behavior of the vehicle or a second driving mode in which steering of the vehicle depending on the operation of the occupant is required;
causing, by the display system, the display to display an image indicating the occurrence of the prescribed event to be executed in the first driving mode at a timing before the behavior of the vehicle changes; and
causing, by the display system, the display to display information for prompting the occupant to implement the change in the behavior executed by the driving control in the second driving mode if the prescribed event is continued in the first driving mode when it is determined that switching from the first driving mode to the second driving mode is required before completion of the prescribed event.

8. A storage medium for causing a display system to:
display an image on a display;
execute driving control including a first driving mode in which steering of a vehicle are controlled without depending on an operation of an occupant on the basis of a prescribed event accompanied by a change in behavior of the vehicle or a second driving mode in which steering of the vehicle depending on the operation of the occupant is required;
cause the display to display an image indicating the occurrence of the prescribed event to be executed in the first driving mode at a timing before the behavior of the vehicle changes; and
cause the display to display information for prompting the occupant to implement the change in the behavior executed by the driving control in the second driving mode if the prescribed event is continued in the first driving mode when it is determined that switching from the first driving mode to the second driving mode is required before completion of the prescribed event.

* * * * *